United States Statutory Invention Registration [19]

[11] Reg. Number: H528

Bruchez et al. [43] Published: Oct. 4, 1988

[54] METHOD AND APPARATUS FOR INCREASING SERVICE LIFE OF AUGMENTOR AND COMBUSTION CHAMBER LINERS

[75] Inventors: Raymond J. Bruchez, Lake Park; Gary A. Schirtzinger, Juno; Gunter Eichhorn, North Palm Beach, all of Fla.

[73] Assignee: The United States of America as represented by the Secretary of the Air Force, Washington, D.C.

[21] Appl. No.: 870,552

[22] Filed: Jun. 4, 1986

[51] Int. Cl.[4] ..... F02G 3/00
[52] U.S. Cl. ..... 60/752; 60/753
[58] Field of Search ..... 60/752, 753, 755, 756, 60/757

[56] References Cited

U.S. PATENT DOCUMENTS

| | | | |
|---|---|---|---|
| 2,915,877 | 12/1959 | Darling | 60/753 |
| 4,567,730 | 2/1985 | Scott | 60/753 |

FOREIGN PATENT DOCUMENTS

| | | | |
|---|---|---|---|
| 467264 | 8/1950 | Canada | 60/753 |
| 2140401 | 3/1973 | Fed. Rep. of Germany | 60/753 |
| 624939 | 6/1949 | United Kingdom | 60/753 |

*Primary Examiner*—Donald P. Walsh
*Attorney, Agent, or Firm*—Jules J. Morris; Donald J. Singer

[57] ABSTRACT

A heat shield assembly 10 for attachment to an afterburner liner 18. The heat shield assembly 10 comprises a clamp 14 and an optional support bracket 16 which hold a carbon-carbon panel 12 adjacent to the liner 18. The carbon-carbon panel shields a damaged area 20 of the liner in order to extend the liner's service life.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR INCREASING SERVICE LIFE OF AUGMENTOR AND COMBUSTION CHAMBER LINERS

STATEMENT OF GOVERNMENT INTEREST

The invention described herein may be manufactured and used by or for the Government for governmental purposes without the payment of any royalty thereon.

TECHNICAL FIELD

This invention concerns gas turbine engines and particularly pertains to metal liners used to protect engine parts and casings in engine combustion areas.

BACKGROUND OF THE INVENTION

Aircraft engines burn fuel at very high temperatures. In combustion areas that operate at these high temperatures special metallic liners are required to control combustion temperatures and prevent thermal damage to engine casings and components. This is accomplished through controlled mixing of combustion exhaust and relatively cool gas.

Combustion primarily takes place in two areas in an aircraft engine, the combustion chamber and the augmentor. In the combustion chamber, compressed air from the compressor is heated prior to its expansion that rotates the turbine. In the augmentor, commonly known as the afterburner, fuel is mixed with the turbine exhaust and ignited in order to raise the pressure and velocity of the gases exiting the engine nozzle.

The afterburner chamber forms a very large combustion area which requires a large cylindrical combustion liner. The typical afterburner liner has considerable weight since it must be strong enough to support itself in flight conditions and be capable of withstanding high temperatures generated during afterburner useage. In order to cope with this environment afterburner liners are often coated with a ceramic material to reduce metal erosion and increase liner life expectancy. Some erosion and other thermal damage is, however, common and afterburner liners often need periodic replacement or refurbishment.

Cracking and other damage to liners often stems from low cycle thermal fatigue. Hot areas of liner material are often surrounded by cooler areas and as a result undergo repeated annealing and restraining which can result in cracking. Further the trailing edge of cooling air holes often oxidize and initiate burn throughs which are propagated by oxidation at adjacent cooling holes.

During conventional repairs, holes are drilled at the end of cracks to prevent further cracking. This is an imperfect procedure since often the end of a crack is very difficult to determine without X-ray or other inspection means not available in the field.

When a liner is damaged by a burn through the liner must be removed from the engine, the ceramic coating stripped and the burned through area repaired by welding. After welding the liner needs to be heat treated, recoated with the ceramic and reinstalled in the engine. This process of removal and repair can take days or weeks and substantially increases the amount of time the engine is out of commission. Further, liners repaired by this conventional method rarely have more than 50% of the life expectancy of a new part. Thus conventional repairs are costly in both time and manpower without fully accomplishing their intended purpose of renewing liners.

Both combustion chamber liners and afterburner combustion liners often have specific hot spots that reoccur on particular engines. Although random hot spots do occur it is often possible to determine a combustion flame profile and locate regions of a particular model liner most susceptible to heat damage. Combustion liner design therefore takes into consideration where the liners are heated the most, i.e., hot spots. Since liners are generally cylindrical components, the amount of material required to withstand a hot spot frequently determines the thickness of the entire liner at a particular axial location. Thus liner weight is substantially increased by the need to withstand hot spots. Other methods of taking into consideration combustion hot spots require a mix of materials or designs of varying liner circumferential thicknesses; use of these methods present difficult problems in manufacturing and increase liner manufacturing cost.

In view of the above it is an object of this invention to provide a method and apparatus for repair of combustion liners which substantially reduces the amount of time and effort required to repair damage typical to such liners.

It is a further object of this invention to provide a means of improving combustion liners by providing for combustion hot spots without adding substantial weight or manufacturing cost to such liners.

BRIEF SUMMARY OF THE INVENTION

The invention comprises a method of repairing damaged augmentor and combustion chamber liners. Cantilever supports are attached to a liner at locations adjacent to damaged sections. A carbon-carbon heat shield panel is then assembled onto each cantilever support in order to protect the damaged area from further exposure to hot combustion gases.

In another embodiment of the invention the cantilever supports and carbon-carbon heat shields are installed at predicted hot spots prior to installation of a liner into the engine. Use of carbon-carbon heat shields in this manner can allow overall reduction in liner thickness and weight.

In a preferred embodiment of the invention the cantilever support bracket is a rectangular section which is contoured to match the liner. The carbon-carbon heat hield slides into the support bracket and is attached in a manner which will maintain the heat shield parallel and removed from the surface of the liner. The cantilever support is preferably attached to the combustion liner at a single axial location so that liner thermal growth is unrestrained. Another aspect of this attachment means is the provision for a secondary heat shield support that can be attached at a second location to the combustion liner. This allows for the securing of relatively large panels of carbon-carbon material in afterburner liners.

In another preferred embodiment of the invention the cantilever support is a triangular shaped bracket which forms a standoff mounting pad for the carbon-carbon heat shield. The bracket attaches to the combustion liner at a relatively cool undamaged area adjacent to the damaged (or hot spot) area of the liner. A carbon-carbon heat shield is attached to the bracket and is preferably rectangular shaped and overlaps the damaged or hot spot area sufficiently such that combustion gases will be directed to cooler areas of the liner.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
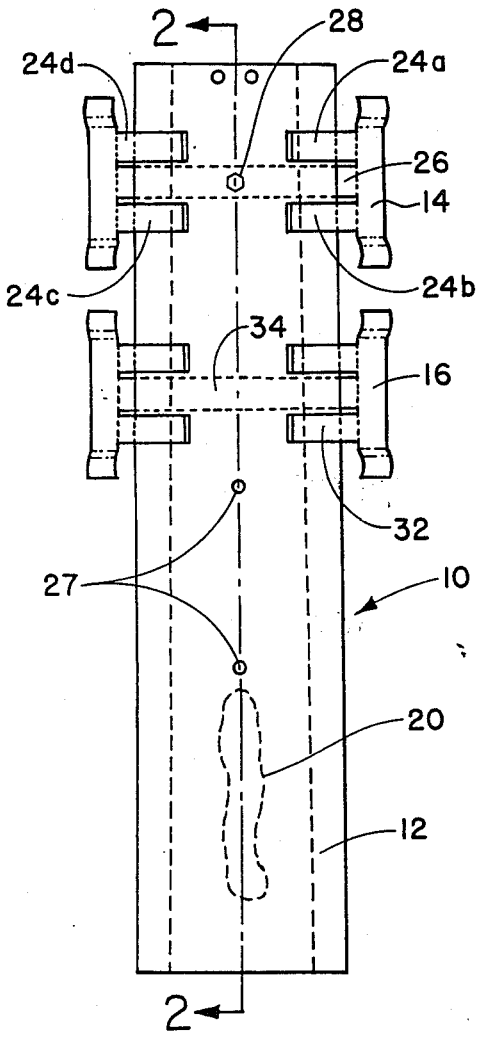
FIG. 1 is a plan view of a heat shield panel and support brackets which embodies the principles of this invention.
Figure 2:
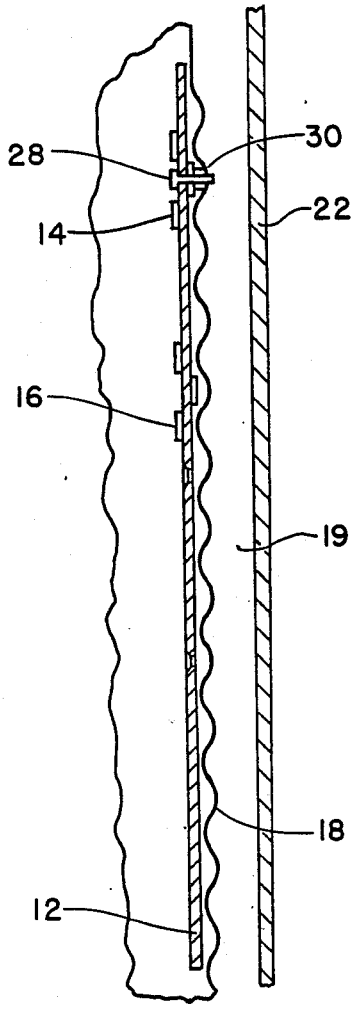
FIG. 2 is a partial side view taken along line 2—2 of FIG. 1 of the panel and brackets of FIG. 1 as mounted onto an augmentor liner.
Figure 3:
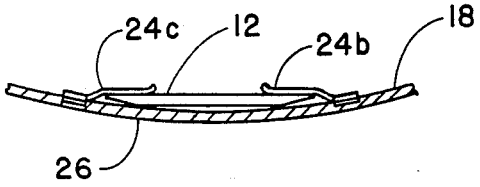
FIG. 3 is a partial end view of the brackets and heat shield of FIG. 1.
Figure 4:
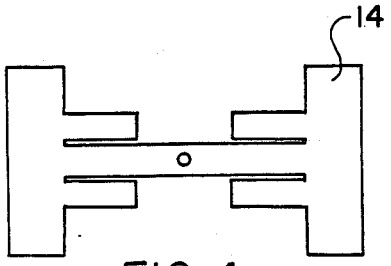
FIG. 4 is a plan view of a bracket of FIG. 1.

FIGS. 1-4 disclose an embodiment of the invention primarily suitable for use in repair or manufacture of augmentor liners. Heat shield assembly 10 comprises a carbon-carbon panel 12 assembled to brackets 14 and 16. The brackets 14 and 16 are for attachment to an augmentor liner 18 (FIGS. 2 and 3). The assembly 10 is suitable for shielding hot spots, cracks or burn throughs shown generally as dotted line 20.

Augmentor liners, also referred to as afterburner liners, are positioned in the afterburner section common to supersonic aircraft engines. Fuel is burned in the aircraft engine exhaust in order to increase engine exhaust velocity. In order to protect the engine nozzle and duct work from the high temperature exhaust gases, an augmentor liner 18 is interposed between the combustion area and the augmentor case, or duct, 22 (FIG. 2). Relatively cool air from the outside 19 of liner 18 is mixed with the heated augmentor air in the interior of the cylindrical liner 18 to form a relatively cool boundary layer that protects the metallic parts, including the liner 18.

Characteristically, the liner has relatively hotter and cooler portions, the hottest portions are commonly called hot spots. The hottest liner portions frequently determine the useful life of an augmentor liner since the liner material often fails at these locations prior to other locations.

Several alternatives are generally presented to extend liner useful lifetime. The liner can be made sufficiently thick or of some unconventional material that it would enable it to withstand elevated temperatures at the spots longer. Another alternative is to periodically repair damage at hot spots to extend engine life. In most instances the second alternative is used.

Thickening the liner in order to greatly extend its useful life is not practicable since the liner would be made a great deal heavier; this would degrade the thrust to weight ratio of the engine. Further, since the casings are cylindrical it is very difficult to vary their thicknesses at particular radial locations, instead the entire axial segment of a liner has to be thickened so that a portion of it can withstand high temperatures. Alternatively, it is very difficult to manufacture these large cylindrical liners out of a composite of different materials that might selectively include materials capable of withstanding very high temperatures. Constructing a liner out of two or more differing materials greatly increases the cost of manufacture especially since many high temperature materials are difficult to machine.

Typically when cracks, burn throughs or other damage occurs in these augmentor liners, the liner must be removed from the engine for repair. Tests have shown that such repaired liners have as little as half the useful life of a new part. Repeated repairs extend the life of such liners even less.

The invention as shown in FIGS. 1-4 can be used to prevent damage to augmentor liners or quickly repair such damage. The invention is particularly useful for quick repir of damaged liners.

Initially sheet metal clamps (or brackets) 14 and 16 are formed to correspond with the contour of augmentor liner 18. Clamp 14 is then permanently affixed to the augmentor liner through the use of rivets or other fastening means that do not require access to the outside 19 of the liner. This provides for installation of the heat shield assembly without disassembly of the liner from the engine.

To form the heat shield a carbon-carbon panel 12 is then slid between fingers 24*a–d* and support back 26. The back support 26 holds the panel 12 adjacent to but spaced away from the liner 18. The panel 12 does not therefore directly contact the liner. Fingers 24 restrain the liner radially.

The carbon-carbon panel is provided with a number of clamping holes 27. The hole 27 that is most useful in aligning the panel with damaged area 20 is aligned with bracket support back 26. The panel is then secured to clamp 14 with a single bolt 28 which passes through a panel hole 27 and screws into locking nut 30 that has been previously affixed to support back 26. The bolt 28 positions and restrains the panel axially while the clamp fingers restrain the panel in the radial and circumferential (side to side) directions. The single bolt attachment means permits for thermal growth between the panel and the clamp since the panel (and clamp) may expand or contract in a unrestrained manner.

A second guide clamp, or support guide, 16 can be slid onto the panel and attached to the liner 18 in instances when large panels 12 are used. The guide clamp 16 is made similar to or identical to clamp 14. It would therefore support the panel by means of four fingers 32 and a back support 34. The second clamp 16, however, need not be axially affixed to the panel 12 (no axial bolt 28 is required), instead, the panel is free to move axially relative to clamp 16. Conversely, clamp 16 which is tightly attached to liner 18 is free to move relative to the panel 12 so as to correspond to thermal growth of the liner 18. The bracket however does serve to provide additional restraint in the radial and circumferential directions.

The panels 12 are preferably of sufficient size to overlap hot spots or damaged areas 20. The brackets are therefore placed in a relatively cool undamaged area of the augmentor liner 18 and the panel extends over and beyond the damage area 20. It is preferred that the panel begins and ends in relatively cool areas. This is in order to prevent further growth of the damaged area 20 and to provide an adequate airstream transition back to the liner material. Attaching the bracket to a relatively cool area of the liner also serves to extend the life of the brackets as well as the fastening means used to attach the brackets to the liner and the panel to the brackets. As a result of this type of installation hot exhaust gases will be initially directed to the high temperature material of the panel 12 and then transition to cooler portions of the liner.

The panel 12 is preferably manufactured from carbon-carbon or similar material. The carbon-carbon material is capable of withstanding extremely high temperatures without damage and has previously been used on spacecraft reentry vehicles. Carbon-carbon is manufactured from a cloth of pure carbon fibers impregnated with a bonding and hardening agent which is heated to form a solid part. The panel 12 can be made into a variety of shapes but it is preferred to minimize the number of panel shapes and sizes in order to lower manufacturing and inventory expenses.

Figure 5:
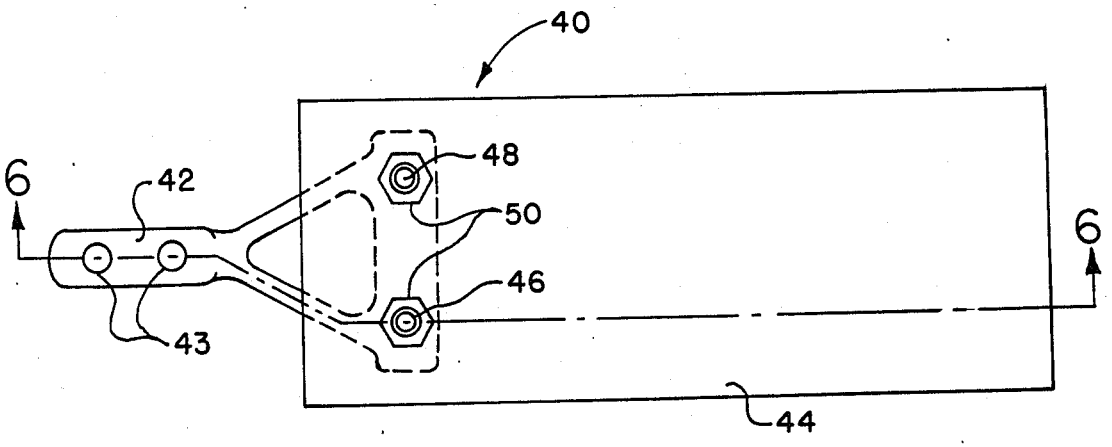
FIG. 5 is a plan view of the an embodiment of the invention that is particularly useful for small heat shield panels or small combustion liners.
Figure 6:
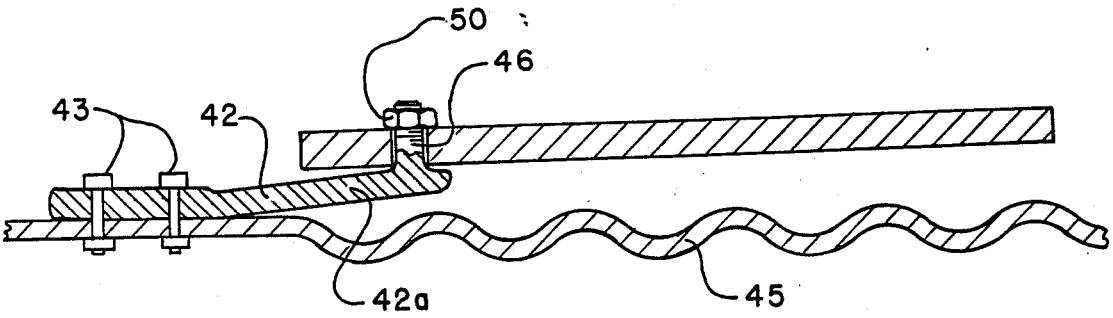
FIG. 6 is a cross section of the assembly of FIG. 5 taken along line 6—6 of FIG. 5 which also partially shows a combustion liner to which the bracket is assembled.

A different embodiment of the invention can be understood with reference to FIGS. 5 and 6. This embodiment is particularly useful for securing small heat shield panels as may be required for combustion chamber liners or augmentor liners. The heat shield assembly 40 comprises a triangularly shaped cantilever support bracket 42 and a rectangular panel 44 of heat shield material. Typically the bracket 42 is attached to a cool area of an augmentor or combustion chamber liner adjacent to a hot spot or damaged area. The bracket 42 is riveted by rivets 43 or bolted to the liner 45 as shown in FIG. 6.

Cantilever support 42 is provided with integral studs 46 and 48. A carbon-carbon panel 44 is placed upon the two studs and secured with a locking nuts 50. An angled portion 42*a* diverges from the liner 45 to hold the studs spaced adjacent to the liner. The support thereby holds the heat shield panel adjacent to, but spaced away from the damaged or hot spot area. This method provides for freedom of thermal growth between the panel 44 and the liner 45. The support and the studs 46, 48 restrain the panel both axially and radially.

This type of support is suitable for use with large or small panels. It can be used as original equipment to protect known high temperature areas of combustion chamber or augmentor liners. It can also be used for repairs of installed augmentor liners. In the case of a combustion chamber liner, however, any repair requires removal of the combustion chamber liner from the engine. Combustion chambers, it should be noted, are less tolerant of airstream changes that may result from the use of heat shield panels than afterburner liners. Airstream changes that effect combustion may limit the size of the heat shields (10, 40) used in combustion chamber liners.

As was in the case of the previous embodiment, the carbon-carbon panel should preferably overlap the damaged or hot spot area. Exhaust air would therefore impact the heat shield material 44 and then transition to the liner in a relatively cool area. The highest temperatures should therefore be confined to the high temperature heat shield.

These embodiments allow the use of high temperature materials where required in a combustion chamber or augmentor liner without requiring difficult manufacturing tasks. In certain instances use of this device may also reduce the weight and cost of current design liners since coverage of hot spots with carbon-carbon heat shields may allow reduction in weight and material for the remainder of the liner.

While the invention has been particularly described with reference to the preferred embodiments thereof, it will be understood by those skilled in the art that various changes in substance and form can be made therein without having departed from the spirit and the scope of the invention as detailed in the attached claims. For example, although the invention has been particularly described with reference to aircraft engines it could also be applied to a number of combustion systems including ram jets and turbine engines for hypersonic travel.

We claim:

1. A method of repairing a damaged augmentor liner of a gas turbine engine, the method comprising the steps of:

(a) identifying a damaged section of the augmentor liner;

(b) attaching with a fastener a cantilever support to the liner at a location adjacent to the damaged section wherein the cantilever support is oriented parallel and adjacent to the augmentor liner and comprises four fingers extending partially across said cantilever support and a support back extending across said cantilever support; and (c) assembling a carbon-carbon heat shield panel onto the cantilever support wherein the heat shield is held between said fingers and said support back of said cantilever support against radial and circumferential movement and is fastened to said back support by a fastener so that the heat shield is positioned to overlap the damaged area of said augmentor liner and direct air flow to undamaged areas of the augmentor liner.

2. The method of repairing a damaged augmentor liner of claim 1 wherein said cantilever support is attached to said liner with a single rivet fastener at a single axial location to allow for thermal growth of the liner.

3. A repair shield that extends the useful life of afterburner liners, the repair shield comprising:

(a) a triangularly shaped cantilever support bracket for attachment to an afterburner liner, the support bracket being attached to the liner by axially aligned fasteners which will not restrain circumferential thermal growth of the afterburner liner; and (b) a carbon-carbon heat shield attached to said triangularly shaped support bracket by a fastener, the heat shield of sufficient size to overlap a damaged area of the afterburner liner and direct hot combustion gases to undamaged portions of the afterburner liner and wherein said triangularly shaped support bracket further comprises an inwardly angled portion for holding the heat shield parallel and adjacent to the afterburner liner without the heat shield being in contact with the afterburner liner.

4. The repair shield of claim 3 wherein the cantilever support is attached to the liner in a relatively cool area with respect to the average temperature of the afterburner liner.

* * * * *